United States Patent [19]

Niggemann et al.

[11] Patent Number: 5,515,278

[45] Date of Patent: May 7, 1996

[54] CIRCUIT FOR CONTROLLING, MONITORING, AND TERMINATING CONTROL OF, INDUCTIVE LOADS, PARTICULARLY MAGNETIC VALVES IN AN ANTI-LOCK CONTROL SYSTEM

[75] Inventors: Detlef Niggemann, Steinhausen; Werner Wiegmann, Lippstadt; Günther Heinz, Ochtendung; Konrad Schneider, Horhausen, all of Germany

[73] Assignees: Hella KG Hueck & Co., Lippstadt, Germany; Lucas Industries public limited, West Midlands, Great Britain

[21] Appl. No.: 10,005

[22] Filed: Jan. 27, 1993

[30] Foreign Application Priority Data

Jan. 31, 1992 [DE] Germany .......................... 42 02 761.6

[51] Int. Cl.[6] ................................ B60T 8/00; H01F 7/18
[52] U.S. Cl. ................ 364/426.02; 364/483; 303/122.06
[58] Field of Search ........................ 364/426.02, 424.03, 364/431.12, 431.11, 483, 481, 492, 551.01; 303/92; 371/14, 15.1, 16.5, 21.4; 361/18, 56, 86, 88, 91, 90; 324/415, 416, 500, 503, 510, 511, 512, 522

[56] References Cited

U.S. PATENT DOCUMENTS

| | | | |
|---|---|---|---|
| 3,838,891 | 10/1974 | Hamelin | 303/21 |
| 3,920,284 | 11/1975 | Lane et al. | 303/92 |
| 4,700,304 | 10/1987 | Byrne et al. | 364/426.02 |
| 4,703,388 | 10/1987 | Ruhnau | 361/91 |
| 4,916,698 | 4/1990 | McCann | 371/16.3 |
| 5,130,883 | 7/1992 | Edwards | 361/91 |
| 5,161,112 | 11/1992 | Guerra et al. | 364/483 |
| 5,205,619 | 4/1993 | Holst et al. | 303/92 |
| 5,285,344 | 2/1994 | Heitzmann | 361/22 |

FOREIGN PATENT DOCUMENTS

| | | |
|---|---|---|
| 0025913A2 | 4/1981 | European Pat. Off. . |
| 0179194A1 | 4/1986 | European Pat. Off. . |
| 0340918A2 | 11/1989 | European Pat. Off. . |
| 0397102A2 | 11/1989 | European Pat. Off. . |
| 0402928A2 | 12/1990 | European Pat. Off. . |
| 0410188A2 | 1/1991 | European Pat. Off. . |
| 0418665A1 | 3/1991 | European Pat. Off. . |
| 2732512 | 1/1979 | Germany .................. H01F 7/18 |
| 3322006 | 12/1984 | Germany .................. G05B 1/02 |
| 3915456 | 11/1990 | Germany .................. H02J 13/00 |
| 3922900 | 1/1991 | Germany .................. H01F 7/18 |
| 3928651 | 7/1991 | Germany .................. H03F 1/00 |

OTHER PUBLICATIONS

H. Sax, Verlustarme Ansteuerung von Aktuatoren, 13 Nov. '87, pp. 142–152 from "Elektronik".

Primary Examiner—Kevin J. Teska
Assistant Examiner—Tan Nguyen
Attorney, Agent, or Firm—Griffin, Butler, Whisenhunt & Kurtossy

[57] ABSTRACT

A circuit has circuit amplifiers (T1, T2) and inductive loads (MV1, MV2) with the circuit amplifiers being controlled by control signals provided by a microcomputer (MC). The circuit accomplishes this control while monitoring a load circuit, comprised of the circuit amplifiers and the loads, and terminates control of the circuit amplifiers, without assistance of the controlling microcomputer, upon occurrence of incorrect voltages in the load circuit. Thus, the circuit of this invention allows particularly fast termination of control of the load circuit upon the appearances of critical voltages and also allows the monitoring of the load circuits by the microcomputer in a particularly uncomplicated manner.

17 Claims, 2 Drawing Sheets

CIRCUIT FOR CONTROLLING, MONITORING, AND TERMINATING CONTROL OF, INDUCTIVE LOADS, PARTICULARLY MAGNETIC VALVES IN AN ANTI-LOCK CONTROL SYSTEM

BACKGROUND OF THE INVENTION

An anti-lock control system is among the most safety-relevant devices in a motor vehicle. Since the lives and health of a driver and passengers are directly dependent upon flawless functioning of such a system, it is necessary to carefully monitor operation of the entire system and individual components thereof. In this regard, it is particularly important to monitor magnetic valves, which directly engage a hydraulic brake system, and the circuit amplifiers which control the magnetic valves.

This invention relates to a circuit for controlling and monitoring inductive loads, particularly magnetic valves in an anti-lock control system, comprising at least one circuit amplifier for coupling at least one inductive load to a voltage source and a microcomputer controlling the at least one circuit amplifier and monitoring a voltage status at an interface between the circuit amplifier and the inductive load.

Such a circuit is known, for example, from German patent document DE-OS 39 28 651. There, a microcomputer controls a load by means of an output amplifier. A control lead transmits a voltage signal to the microcomputer from an interface between the circuit amplifier and the load. In addition, a resistor arrangement and a switching device are provided which, also, under control of the microcomputer, read voltages at various points in the load circuit and transmit this information to the microcomputer via an additional signal lead. Further, it is provided for the microcomputer to control the output amplifier one time, or on a particularly regular basis, that is, even during an anti-lock control process, for a period, or periods, of time short enough not to activate the magnetic valve. Meanwhile, the microcomputer reads the voltages at various points by means of a switching circuit, or device. Thereby, the microcomputer can detect short circuits and/or lead interruptions within the load circuit made up of the output amplifier and the magnetic valve.

Such an arrangement is quite cost-intensive with respect to hardware and software. That is, in addition to the output amplifier, a resistor arrangement and a switching circuit, or device, are required. This necessitates at least two additional terminals of the microcomputer for each magnetic valve monitored, because there must be a control lead from the microcomputer to the switching device and a lead returning detected voltage signals to the microcomputer.

In addition, continuous monitoring requires additional software, particularly for monitoring the voltage also during an anti-lock control process. In this regard, the microcomputer must drive the output amplifier for a short period of time, practically inbetween other demanding control processes, without operating the magnetic valve. Also, the microcomputer must control the switching device and detect various voltages without negatively influencing the anti-lock control process, which is complicated enough in itself.

It is a disadvantage of this arrangement that both the controlling and the monitoring of the circuit amplifier are performed only by the microcomputer. If the output amplifier shows a high power loss, for example, due to an incompletely-controlled final-stage transistor or due to a closing of, or a short in, a winding of the magnetic valve coil, the speed of fault detection and a resulting termination of the control of the output amplifier is particularly dependent upon a program performance time of the microcomputer. This time is in the range of several milli-seconds and is generally not short enough to prevent destruction of the transistor due to increased power loss. Thus, one of the mentioned malfunctions leads almost inevitably to the destruction of the output amplifier.

It is an object of this invention to provide a circuit for controlling and monitoring inductive loads, particularly magnetic valves in an anti-lock control system, which is constructed in an uncomplicated and cost-effective manner and provides higher operation safety than circuits of the prior art and allows controlling and monitoring of a load circuit by means of a microcomputer in a less complicated, and less cost-intensive, manner.

SUMMARY

According to principles of this invention, a threshold monitor detects a voltage status at an interface and a circuit arrangement is provided to terminate control of a circuit amplifier when the threshold monitor detects a voltage at the interface outside of a threshold range of the threshold monitor during such control.

In the circuit arrangement of this invention, the voltage status at the interface, or coupling, between the circuit amplifier and the inductive load is monitored by a microcomputer as is known from prior art German patent document DE-OS 39 28 651. However, in a circuit according to this invention, it is not necessary for the microcomputer to monitor voltages at various measuring points within the load circuit, so that a switching device for detecting a voltage at various points, a resistor arrangement, and at least two signal leads from and to the microcomputer are not needed. Instead, devices are provided for terminating the control upon occurrence of critical voltage levels while the circuit amplifier is being controlled. The circuitry of these devices is constructed in an uncomplicated manner and comprises uncomplicated, basic circuits such as a threshold monitor, a logic AND circuit, a delay circuit and a memory element.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
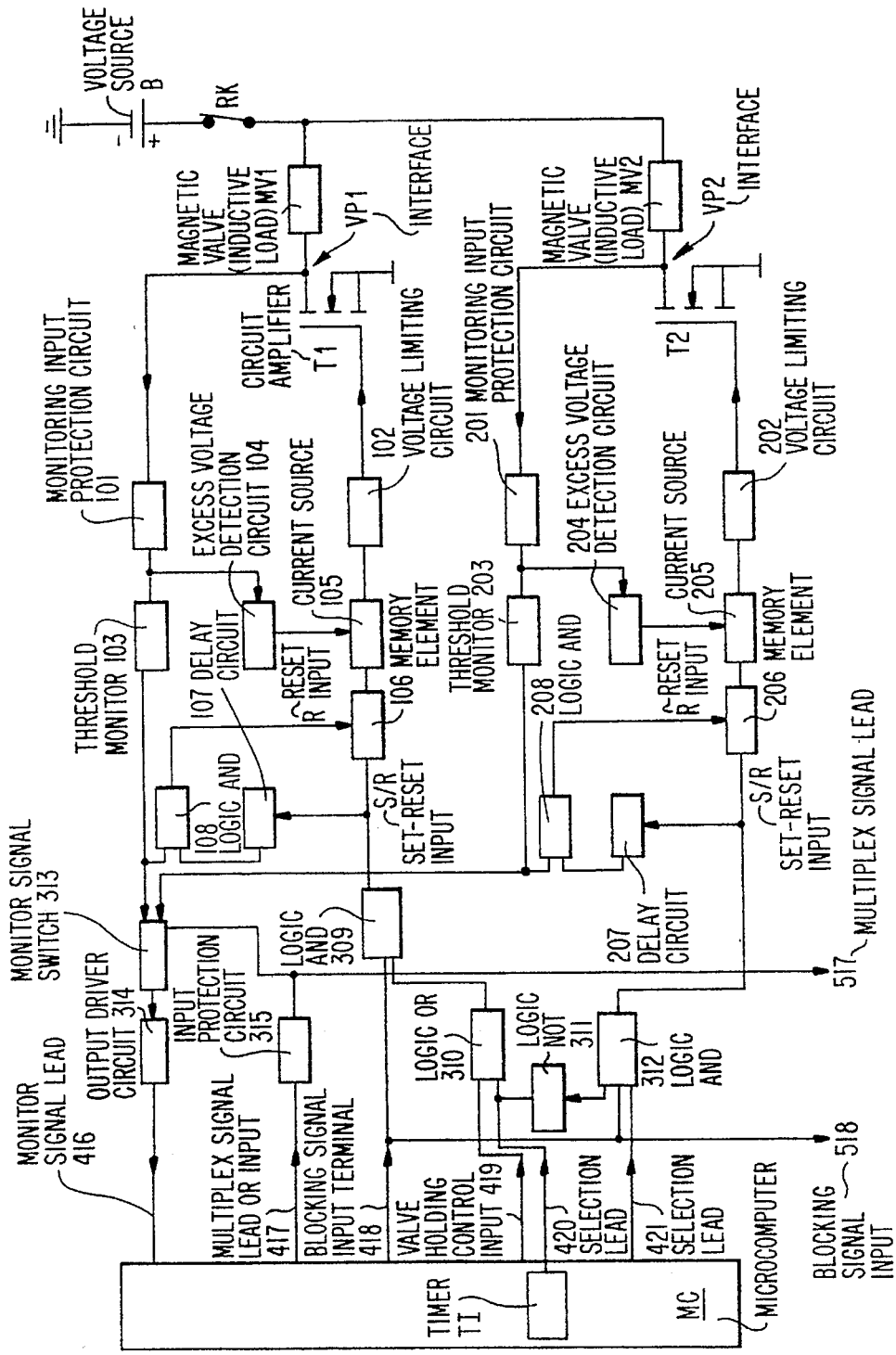
FIG. 1 is a schematic block diagram of a circuit unit according to this invention.

FIG. 1 shows a circuit unit of a circuit according to this invention comprising two control and monitoring branches 101–108, 201–208 for controlling two circuit amplifiers T1, T2 each of which can couple an inductive load MV1, MV2 to a voltage source B. It should be understood that, basically, the same description applies to each of these branches, thus, they are often described below in a singular grammatical form. These inductive loads are, for example, magnetic valves in an anti-lock control system, with the first magnetic valve MV1 maintaining hydraulic pressure in a brake hose of a wheel and the second magnetic valve MV2 reducing the hydraulic pressure therein. The circuit unit shown in FIG. 1 is a control and monitoring circuit for one of four control lines of an anti-lock control apparatus.

The circuit amplifiers T1, T2, which control the magnetic valves MV1, MV2, are power MOS transistors and are each respectively controlled by a current source 105, 205 via a voltage limiting circuit 102, 202. This is done dependent upon a switched status of a memory element 106, 206.

The voltage limiting circuit 102, 202 functions to limit voltage peaks applied to a control input terminal of the circuit amplifier T1, T2 during control, or circuit operations, thus protecting the circuit amplifier T1, T2 from destruction.

The most uncomplicated version of such a current limiting circuit is a simple Zener diode circuit. It is beneficial in one embodiment of this invention to use an amplifier component.

A voltage signal is transmitted to a threshold monitor 103, 203 and an excess voltage detection circuit 104, 204 from the interface between the circuit amplifier T1, T2 and the magnetic valve MV1, MV2 via an input protection circuit 101, 201. The excess voltage detection circuit 104, 204 is activated by voltages above a predetermined maximum of typically approximately 40V which occur as termination voltage surges particularly during deactivation of the inductive magnetic valves MV1, MV2. If the excess voltage detection circuit 104, 204 detects voltages above the maximum, it acts on the current source 105, 205 such that the current source 105, 205 controls the circuit amplifier T1, T2 so that the voltage surge does not exceed the predetermined maximum.

The threshold monitors 103, 203 each transmit a logical signal responsive to the level of the voltage detected at the interfaces VP1, VP2. This logical signal is transmitted via a monitor signal switch 313, an output driver circuit 314 and a monitor signal lead 416 to a controlling microcomputer MC which can detect, dependent upon this logical signal and a control signal transmitted at that moment by the microcomputer to the corresponding magnetic valve MV1, MV2, if there is a short circuit or a circuit interruption in the respective load circuit T1, MV1, B or T2, MV2, B.

If the microcomputer MC detects such a malfunction, it switches off the malfunctioning magnetic valve MV1, MV2 or deactivates all magnetic valves via a blocking signal input terminal 418, thus reducing the brake system to braking without support from the anti-lock control system. This blocking signal is also transmitted via the signal lead 518 to further circuit units or control leads, thereby causing termination of all magnetic valves of an anti-lock control system, or apparatus. The microcomputer MC can also block control of the magnetic valves MV1, MV2 via the blocking signal input terminal 418 upon occurrence of malfunctions of other elements, not shown in FIG. 1, of the anti-lock control apparatus.

The blocking signal input 418 has particular significance in that it can be coupled with further, not shown in FIG. 1, devices (for example a second microcomputer or an external monitoring circuit "watch-dog"), thus providing an additional independent monitoring branch.

The microcomputer MC switches back and forth between the monitoring signals of the threshold monitors 103, 203 by means of a multiplexing signal which is transmitted to the monitor signal switch 313 via a multiplexing signal lead 417 and an input protection circuit 315. Thus, only one monitoring signal lead 416 is required for two magnetic valves. Since the same multiplex signal is also transmitted to further control channels, or leads, via a signal lead 517, one signal lead to the microcomputer for each two additional magnetic valves can be saved.

The logic elements of the FIG. 1 circuit include:

| logic AND elements | 108, 208 |
| logic AND element | 309 |
| logic OR element | 310 |
| logic NOT element | 311 |
| logic AND element | 312. |

Selection of magnetic valves to be controlled is made by means of selection leads 418–421 via respective ones of the above mentioned logic elements. For controlling at least one magnetic valve, a high-signal must be applied to the blocking signal lead 418 (active low), otherwise the logic AND element 309 blocks control of the magnetic valves. The combination of the logic signals applied to the selection leads 419–421 determines which magnetic valves MV1, MV2 are being controlled. If, for example, the valve-holding (maintaining), control- input, terminal 419 receives a low-signal and the other selection leads 420, 421 each receive a high-signal, only magnetic valve MV1 is being controlled. A high-signal is transmitted via logic OR element 310 and logic AND element 309 to a set-reset input S/R of the memory element 106, thus resetting it. The memory element 106 now controls the magnetic valve MV1 via the current source 105, the output voltage limiting circuit 102 and the circuit amplifier T1. Only after activation of the circuit amplifier T1 does the logic AND element 108 receive the high-signal from the logic AND element 309 via the delay circuit 107. If the threshold monitor 103 detects a voltage at the interface VP1 between the circuit amplifier T1 and the magnetic valve MV1 that is above a threshold value, thus indicating a malfunction of the control of the magnetic valve MV1, the threshold monitor 103 transmits a high-signal to the monitor signal switch 313 and the logic AND circuit 108.

The microcomputer MC switching lead 420 is coupled to a timer TI of the microcomputer. After a predetermined time following the beginning of control of the circuit amplifier T1, the timer TI applies a signal to the switching lead 420 to terminate control of the circuit amplifier.

Since the logic AND element 108 receives a high-signal also from the delay circuit 107, the logic AND element 108 resets the memory element 106 via a reset input terminal R thereof, thus terminating the faulty control of the magnetic valve MV1. The time constant of the delay circuit 107 is set to be very short within the range of micro seconds. The delay circuit serves to stop "bouncing" termination action (by preventing deactivation due to spikes, or surges) during activation of the magnetic valve MV1.

Further "debouncing" or smoothing, is performed within the threshold monitor 103, thus preventing short-term disturbances from causing termination of an inductive load.

Similarly, controlling and monitoring of the circuit amplifier T2 and the magnetic valve MV2 is effected by means of the controlling and monitoring branch 201–208 of the circuit of this invention.

Thus, the control and monitoring circuit of this invention independently detects and eliminates, that is without participation of the controlling microcomputer MC, a malfunctioning control of the circuit amplifier T1, T2 and/or the magnetic valve MV1, MV2.

Since the voltage status at the interfaces VP1, VP2 is transmitted, via the above mentioned devices (101, 103 or 201, 203), 313, 314, 416, also to the microcomputer MC, the microcomputer also detects faulty voltages and can, thus, terminate accordingly control of the respective circuit amplifiers T1, T2. However, since this manner of termination depends upon the program processing time of the microcomputer, it is multifold slower than the above described hardware-related termination whose timing is basically determined by the time constant of the delay circuit 108, 208.

Nevertheless, it is beneficial to supply the microcomputer with a signal indicating the voltage status at the interfaces VP1, VP2, since the microcomputer may detect further faults or malfunctions which do not require immediate deactivation. If, for example, a power interruption occurs in the load circuit, such as an interruption in a winding of the magnetic valve MV1, an insufficient potential develops at the interface VP1 when the circuit amplifier T1 is not controlled, which may be detected by the microcomputer. Since the magnetic valve MV2 cannot be activated first, quick termination of operation of magnetic valve MV2 is, in this case, impossible and not required.

The microcomputer receives the same signal, when the circuit amplifier T1 is not controlled, in case the circuit amplifier T1 experiences a short circuit, thus permanently activating the magnetic valve MV1. Upon occurrence of such a malfunction, driving of magnetic valve MV1 cannot be prevented by manipulating the circuit amplifier control T1. Termination of the malfunctioning magnetic valve MV1 must be effected in this case externally, for example, by means of a contact RK of a safety relay, located in the voltage supply lead of the magnetic valve, which is opened in case of malfunction. Termination by means of this safety relay can be particularly effected by the microcomputer MC, thus monitoring of malfunctioning load circuits by means of the microcomputer is beneficial in any case.

Figure 2:
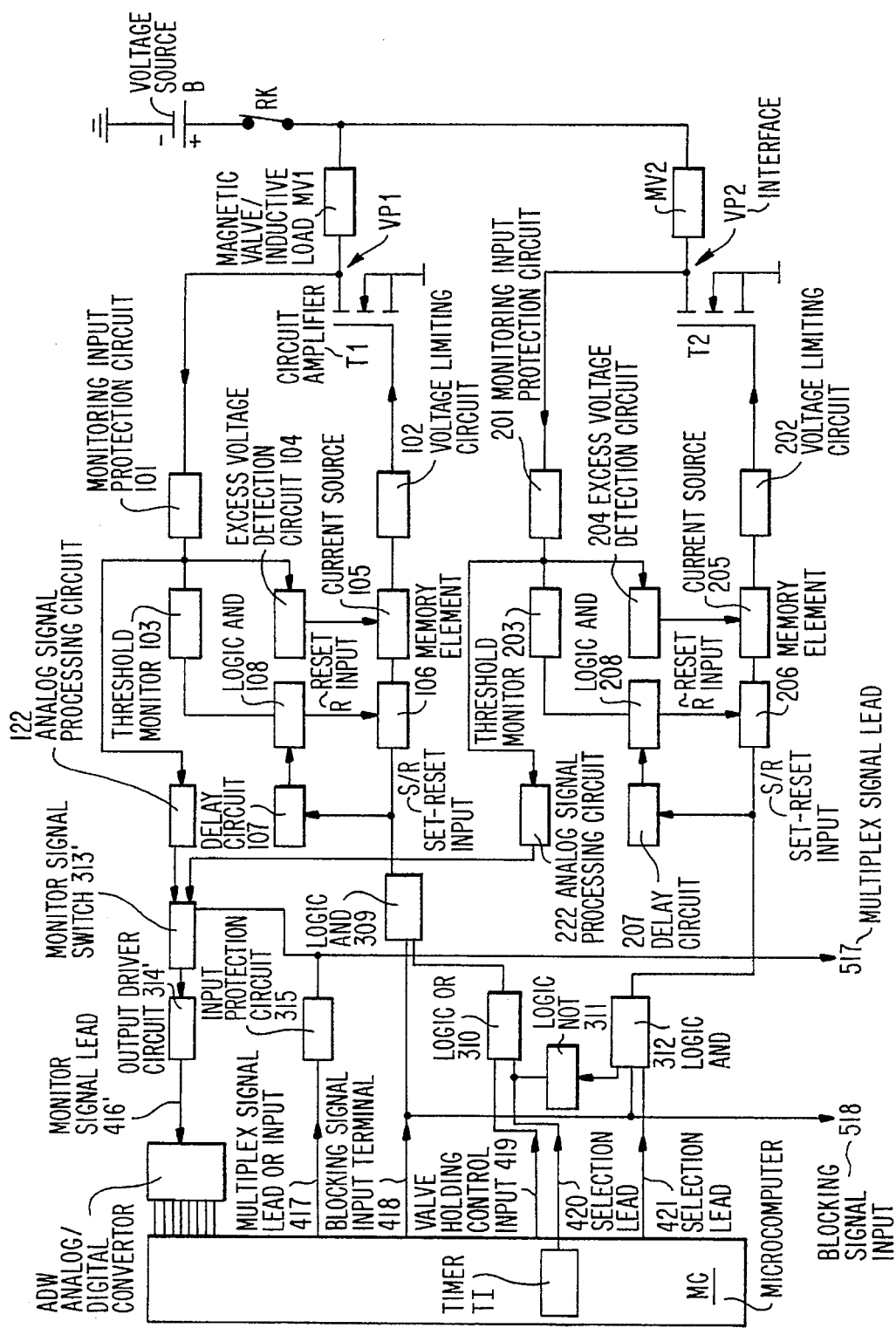
FIG. 2 shows another embodiment of the embodiment depicted in FIG. 1.

FIG. 2 depicts another beneficial embodiment of the invention described in FIG. 1. The only difference to the above described circuit is that in this circuit the microcomputer MC does not receive a digital, but rather an analog signal via a monitor signal lead 416'.

This analog signal is generated by the analog signal processing circuit 122, 222 from the voltage signals produced by the monitor signal input protection circuit 101, 201.

Transmission of this analog monitoring signal to the monitor signal lead 416' is performed, in the same manner as in the above described embodiment, via a monitor signal switch 313' and a output driver circuit 314', wherein the mentioned circuit elements 313', 314', 416' are particularly designed for processing analog signals.

The analog monitoring signal arrives, via the monitoring signal lead 416', at an analog/digital convertor ADW which transmits a digital, several-bit-size data word, corresponding to the monitoring signal, to the microcomputer MC, whereby the microcomputer receives information about the exact level of voltages at interfaces VP1, VP2, thereby allowing qualitative as well as quantitative monitoring of the functions of the magnetic valves MV1, MV2 and the circuit amplifier T1, T2 in this embodiment.

A particular benefit of the arrangement of this invention is that in case of malfunction, termination of circuit amplifier control is performed without assistance of the microcomputer. Since the termination is independent from program processing time of the microcomputer (reference is made herein particularly to the time needed by the microcomputer for running its examination program), termination can be effected very quickly and is typically in a range of $10^3$ times faster than a termination effected by means of the microcomputer. Thereby, the circuit amplifier can be saved from destruction even in case of a short in the load circuit.

It is beneficial to have additional voltage monitoring at interfaces between the circuit amplifiers and the loads by the microcomputer; particularly for malfunctions which do not require instant termination of circuit amplifier control when, for example, controlling a load is not possible in any case due to a power interruption in the load circuit. Such malfunctions are generally less dangerous than continued malfunctioning control since in an anti-lock control system an uncontrolled magnetic valve allows a braking process without assistance from the anti-lock control system. In this regard, it is sufficient if the microcomputer detects the malfunction after several milli seconds and transmits a fault report, for example, or interrupts a voltage supply to the magnetic valves by means of a relay arranged in their voltage supply lead.

In a circuit of this invention, the controlling responsibility of the microcomputer is reduced to controlling the voltage signal to the controlled inductive load, thereby relieving the microcomputer from complex control tasks requiring extensive software. It is also beneficial that the number of required control leads can be reduced.

It is particularly beneficial to provide an excess voltage detection circuit which is activated upon an induction voltage surge occurring as a result of a termination of energy to the inductive load and which causes a circuit amplifier to be controlled such that this voltage surge does not exceed a predetermined maximum. Such a circuit is particularly provided for protection of the circuit amplifier. This kind of voltage limiting control process cannot, or can only at high costs, be performed by the microcomputer by means of circuit amplifier control.

It is further beneficial to provide a signal lead coupled to a timer which is part of the microcomputer. This timer is activated at the beginning of circuit amplifier control and terminates it after a predetermined period of time, thereby allowing very short-term control of loads; thus limiting a pressure level in a hydraulic portion of the anti-lock control system and allowing very sensitive adjustments of brake pressure.

It is beneficial for the components of the control and monitoring circuit to be arranged in an integrated circuit with the exception of the microcomputer and the at least one load circuit. That is, it is particularly beneficial to arrange circuit units comprising components for controlling several, preferably two, load circuits. Such a circuit unit has one common logic element with which a connection between the control and monitoring components are made to the microcomputer. It is particularly beneficial to combine several of these circuit units in one integrated circuit, thereby reducing the number of required signal leads to and from the microcomputer. This is achieved, in particular, by having several circuit units share individual signal leads. A further option for reducing the number of signal leads is for transmitting voltage signals, which are detected at several interfaces between circuit amplifiers and inductive loads, in an alternating series along one shared signal lead to the microcomputer. Using such multiplexing devices allows a reduction of signal leads as a function of the number of circuit units combined into an integrated circuit. That is, it is possible to combine control and monitoring circuits for all load circuits of an anti-lock control system into one integrated circuit.

If an anti-lock control system has several controlling microcomputers, it is beneficial to divide control and monitoring circuits into several integrated circuits, thereby assigning a microcomputer to its own assigned circuit.

While the invention has been particularly shown and described with reference to a preferred embodiment, it will be understood by those of ordinary skill in the art that various changes in form and detail may be made therein without departing from the spirit and scope of the invention.

The embodiments of the invention in which an exclusive property or privilege are claimed are defined as follows:

1. An inductive-load circuit for controlling and monitoring inductive loads comprising;
    at least one circuit amplifier (T1) for coupling at least one inductive load (MV1) in a circuit with a voltage source (B);
    a control circuit (106, 105, 102) coupled to a control terminal of said at least one circuit amplifier; a microcomputer (MC) coupled to said control circuit of said at least one circuit amplifier for applying signals to said control terminal of said at least one circuit amplifier via said control circuit for thereby controlling said at least one circuit amplifier to thereby couple the at least one inductive load in the circuit with the voltage source, said microcomputer being further coupled to said at least one circuit amplifier via a monitoring circuit (101, 103);
    said monitoring circuit (101, 103) for monitoring a voltage status at an interface (VP1) of the at least one circuit amplifier and the inductive load, wherein said monitoring circuit includes a threshold monitor (103) coupled to said interface for detecting the voltage status at the interface;
    wherein said inductive load circuit further includes a first circuit means (108) coupled between said threshold monitor and said control circuit for causing said control circuit to terminate control of the at least one circuit amplifier by the microcomputer via said control circuit when the threshold monitor detects a voltage at said interface outside of a threshold range thereof while said at least one circuit amplifier is being controlled by said microcomputer to couple the at least one inductive load in the circuit.

2. An inductive load circuit as in claim 1 wherein the first circuit means (108) terminates control of the circuit amplifier independently of such control being terminated by the microcomputer.

3. An inductive load circuit as in claim 1 wherein said monitoring circuit further includes an output driver circuit (313), coupled between said threshold monitor and said microcomputer, also transmits a signal to the microcomputer responsive to the voltage status at said interface.

4. An inductive load circuit as in claim 3 wherein said inductive load circuit includes a plurality of circuit amplifiers and inductive loads, each having an interface therebetween, and wherein said inductive load circuit further includes a monitoring signal switch for transmitting alternating signals corresponding to the voltages at several interfaces to the output driver circuit.

5. An inductive load circuit as in claim 3 wherein said signal transmitted to said microcomputer responsive to the voltage status at the interface is a digital signal.

6. An inductive load circuit as in claim 5 wherein an analog-digital convertor is arranged between the output driver circuit and the microcomputer for transmitting several-bit-sized data words corresponding to the analog signals to the microcomputer.

7. An inductive load circuit as in claim 3 wherein said signal transmitted to said microcomputer responsive to voltage status at the interface is an analog signal.

8. An inductive load circuit as in claim 1 wherein is further included a second circuit means (104) coupled between said monitoring circuit and said control circuit comprising at least one excess voltage detection circuit coupled between said interface and said at least one circuit amplifier for detecting a voltage surge at the interface during a deactivation process of the inductive load and controlling the control circuit to control said at least one circuit amplifier for limiting the voltage surge to a predetermined maximum value.

9. An inductive load circuit as in claim 8 wherein said first and second circuit means are in parallel with one another, with each being coupled to said control circuit.

10. An inductive load circuit as in claim 9 wherein said second circuit means is coupled to a portion (105) of said control circuit that is in an electrical series path closer to said at least one circuit amplifier than a portion (106) of said control circuit to which said first circuit means is coupled, whereby the voltage status detected by said threshold monitor (103) and thereby used by said first circuit to cause said control circuit to terminate control of the at least one circuit amplifier by the microcomputer, has had voltage surges limited by said second circuit.

11. An inductive load circuit as in claim 1 which further includes a voltage limiting circuit (102) for limiting the voltage at said input control terminal of the circuit amplifier to a maximum value.

12. An inductive load circuit as in claim 1 wherein is further included a switching signal lead (420) which is coupled to a timer of the microcomputer and to the control circuit and to which is applied a signal by said timer, after a predetermined time following the beginning of control of the circuit amplifier, resulting in termination of control of the circuit amplifier.

13. An inductive load circuit as in claim 1 wherein said microcomputer further includes a blocking signal input terminal (418) coupled to a logic element (309) positioned between said computer and said circuit amplifier for blocking signals sent to the circuit amplifier and thereby reducing control of said inductive loads.

14. An inductive load circuit as in claim 1 which further comprises a second inductive load, a second circuit amplifier, a second threshold monitor and a further first circuit means coupled in a separate branch of said circuit so that there are two controlling and monitoring branches, each for respectively controlling one of the two circuit amplifiers.

15. An inductive load circuit as in claim 14 wherein the controlling and monitoring branches of said circuit unit share a connecting terminal to the microcomputer.

16. An inductive load circuit as in claim 14 wherein said two controlling and monitoring branches are formed as a single integrated circuit.

17. An inductive load circuit as in claim 16 wherein there are only two controlling and monitoring branches combined into said integrated circuit.

* * * * *